(12) United States Patent
Hamakubo et al.

(10) Patent No.: US 11,914,186 B2
(45) Date of Patent: Feb. 27, 2024

(54) OPTICAL FIBER

(71) Applicant: SUMITOMO ELECTRIC INDUSTRIES, LTD., Osaka (JP)

(72) Inventors: Katsushi Hamakubo, Osaka (JP); Yuya Homma, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 650 days.

(21) Appl. No.: 17/041,794

(22) PCT Filed: Apr. 16, 2019

(86) PCT No.: PCT/JP2019/016342
§ 371 (c)(1),
(2) Date: Sep. 25, 2020

(87) PCT Pub. No.: WO2019/203236
PCT Pub. Date: Oct. 24, 2019

(65) Prior Publication Data
US 2021/0026065 A1 Jan. 28, 2021

(30) Foreign Application Priority Data

Apr. 16, 2018 (JP) ................................. 2018-078261

(51) Int. Cl.
*G02B 6/02* (2006.01)
*C03C 25/1065* (2018.01)
(Continued)

(52) U.S. Cl.
CPC ...... *G02B 6/02395* (2013.01); *C03C 25/1065* (2013.01); *C03C 25/285* (2013.01);
(Continued)

(58) Field of Classification Search
CPC ............ G02B 6/02395; C03C 25/1065; C03C 25/285; C03C 25/48; C08F 290/06; C08K 3/36; C08K 2201/005; C08K 2201/011
See application file for complete search history.

(56) References Cited

U.S. PATENT DOCUMENTS

| 4,015,031 A | 3/1977 | Reinhardt et al. |
| 4,525,026 A | 6/1985 | Elion |

(Continued)

FOREIGN PATENT DOCUMENTS

| CN | 102686528 A | 9/2012 |
| CN | 104312065 A | 1/2015 |

(Continued)

OTHER PUBLICATIONS

Shuie, J. et al., "Effects of silica nanoparticle addition to the secondary coating of dual-coated optical fibers," Acta Materialia, Jun. 2006, vol. 54, issue 10, p. 2631-p. 2636.
(Continued)

*Primary Examiner* — Tina M Wong
(74) *Attorney, Agent, or Firm* — Faegre Drinker Biddle & Reath LLP (57) ABSTRACT

An optical fiber comprises a glass fiber comprising a core and a cladding, a primary resin layer being in contact with the glass fiber and covering the glass fiber, and a secondary resin layer covering the primary resin layer, wherein the Young's modulus of the primary resin layer is 0.04 MPa or more and 1.0 MPa or less at 23° C.±2° C., the secondary resin layer consists of a cured product of a resin composition comprising a base resin containing a urethane (meth)acrylate oligomer, a monomer, and a photopolymerization initiator and hydrophobic inorganic oxide particles, and the content
(Continued)

of the inorganic oxide particles is 1% by mass or more and 60% by mass or less based on the total amount of the resin composition.

7 Claims, 1 Drawing Sheet

(51) Int. Cl.
    *C03C 25/285*     (2018.01)
    *C03C 25/48*     (2006.01)
    *C08F 290/06*     (2006.01)
    *C08K 3/36*     (2006.01)

(52) U.S. Cl.
    CPC .......... *C03C 25/48* (2013.01); *C08F 290/067* (2013.01); *C08K 3/36* (2013.01); *C08K 2201/005* (2013.01); *C08K 2201/011* (2013.01)

(56) References Cited

U.S. PATENT DOCUMENTS

| | | | |
|---|---|---|---|
| 4,655,545 | A | 4/1987 | Yamanishi et al. |
| 5,411,761 | A | 5/1995 | Inokuchi et al. |
| 5,908,873 | A | 6/1999 | Shustack |
| 6,304,705 | B1 | 10/2001 | Kalish et al. |
| 7,238,731 | B2 | 7/2007 | Ramsey |
| 11,603,331 | B2 | 3/2023 | Hamakubo |
| 11,629,269 | B2 | 4/2023 | Hamakubo et al. |
| 2002/0099110 | A1 | 7/2002 | Norlin et al. |
| 2003/0026584 | A1 | 2/2003 | Ingman et al. |
| 2004/0179800 | A1 | 9/2004 | Walker et al. |
| 2005/0148676 | A1 | 7/2005 | Doi et al. |
| 2005/0196605 | A1 | 9/2005 | Ramsey |
| 2005/0226582 | A1* | 10/2005 | Nagelvoort .............. C09D 4/06 385/128 |
| 2005/0282938 | A1 | 12/2005 | Yamaguchi et al. |
| 2006/0084716 | A1 | 4/2006 | Zahora et al. |
| 2006/0088263 | A1 | 4/2006 | Tanaka et al. |
| 2006/0217479 | A1 | 9/2006 | Ohkoshi et al. |
| 2007/0122093 | A1 | 5/2007 | Chien et al. |
| 2008/0045623 | A1* | 2/2008 | Yamaguchi ........... C03C 25/106 522/90 |
| 2008/0102262 | A1 | 5/2008 | Esaki et al. |
| 2009/0274424 | A1* | 11/2009 | Debut ..................... C03C 25/47 385/102 |
| 2010/0329617 | A1 | 12/2010 | Bulters et al. |
| 2011/0014477 | A1 | 1/2011 | Kawai et al. |
| 2011/0077334 | A1 | 3/2011 | Oi et al. |
| 2011/0274396 | A1 | 11/2011 | Nakajima et al. |
| 2012/0321265 | A1 | 12/2012 | Terruzzi et al. |
| 2016/0377802 | A1 | 12/2016 | Homma |
| 2017/0003446 | A1 | 1/2017 | Homma |
| 2017/0146715 | A1 | 5/2017 | Bennett et al. |
| 2017/0307814 | A1 | 10/2017 | Tachibana et al. |
| 2017/0307815 | A1 | 10/2017 | Iwaguchi et al. |
| 2018/0095221 | A1 | 4/2018 | Homma et al. |
| 2018/0128969 | A1 | 5/2018 | Iwaguchi et al. |
| 2018/0128970 | A1 | 5/2018 | Homma et al. |
| 2018/0236484 | A1 | 8/2018 | Brown |
| 2018/0273427 | A1 | 9/2018 | Tanaka et al. |
| 2018/0282550 | A1 | 10/2018 | Burgess et al. |
| 2018/0320003 | A1 | 11/2018 | Chen |
| 2019/0112409 | A1 | 4/2019 | Miyachi et al. |
| 2019/0285823 | A1 | 9/2019 | Tanaka et al. |
| 2020/0216714 | A1 | 7/2020 | Hamakubo et al. |
| 2020/0262749 | A1 | 8/2020 | Hamakubo |
| 2021/0009854 | A1 | 1/2021 | Hamakubo |
| 2021/0053870 | A1 | 2/2021 | Hamakubo |
| 2021/0079254 | A1 | 3/2021 | Chiu et al. |
| 2021/0149107 | A1 | 5/2021 | Hamakubo et al. |
| 2021/0179762 | A1 | 6/2021 | Hamakubo et al. |
| 2021/0188705 | A1 | 6/2021 | Hamakubo |
| 2021/0230337 | A1 | 7/2021 | Hamakubo et al. |
| 2021/0263255 | A1 | 8/2021 | Iwaguchi et al. |
| 2022/0041501 | A1 | 2/2022 | Hamakubo |

FOREIGN PATENT DOCUMENTS

| | | |
|---|---|---|
| CN | 107001129 A | 8/2017 |
| CN | 107083159 A | 8/2017 |
| CN | 107406690 A | 11/2017 |
| CN | 107894628 A | 4/2018 |
| CN | 108061933 A | 5/2018 |
| EP | 0 780 712 A2 | 6/1997 |
| EP | 1 930 381 A1 | 6/2008 |
| EP | 3 778 682 A1 | 2/2021 |
| EP | 3 783 409 A1 | 2/2021 |
| EP | 3 882 286 A1 | 9/2021 |
| EP | 3 882 288 A1 | 9/2021 |
| EP | 3 988 514 A1 | 4/2022 |
| JP | S63-002834 A | 1/1988 |
| JP | H02-069706 A | 3/1990 |
| JP | H02-118608 A | 5/1990 |
| JP | H05-019150 A | 1/1993 |
| JP | H05-505202 A | 8/1993 |
| JP | H08-109229 A | 4/1996 |
| JP | H08-134156 A | 5/1996 |
| JP | H09-241341 A | 9/1997 |
| JP | H09-297225 A | 11/1997 |
| JP | H11-513327 A | 11/1999 |
| JP | 2000-007717 A | 1/2000 |
| JP | 2000-026562 A | 1/2000 |
| JP | 2001-066474 A | 3/2001 |
| JP | 2001-240433 A | 9/2001 |
| JP | 2003-277453 A | 10/2003 |
| JP | 2003-315639 A | 11/2003 |
| JP | 2004-161991 A | 6/2004 |
| JP | 2004-204206 A | 7/2004 |
| JP | 2004-217836 A | 8/2004 |
| JP | 2005-213453 A | 8/2005 |
| JP | 2005-301237 A | 10/2005 |
| JP | 2006-137795 A | 6/2006 |
| JP | 2006-188659 A | 7/2006 |
| JP | 2006-265502 A | 10/2006 |
| JP | 2006-524737 A | 11/2006 |
| JP | 2007-046047 A | 2/2007 |
| JP | 2007-131698 A | 5/2007 |
| JP | 2007-533816 A | 11/2007 |
| JP | 2009-510520 A | 3/2009 |
| JP | 2009-518664 A | 5/2009 |
| JP | 2010-511770 A | 4/2010 |
| JP | 2012-219110 A | 11/2012 |
| JP | 2013-037192 A | 2/2013 |
| JP | 2013-197163 A | 9/2013 |
| JP | 2014-219550 A | 11/2014 |
| JP | 2018-526687 A | 9/2018 |
| JP | 2019-504339 A | 2/2019 |
| TW | 201704789 A | 2/2017 |
| TW | 201802194 A | 1/2018 |
| WO | WO-90/013579 A1 | 11/1990 |
| WO | WO-96/011217 A1 | 4/1996 |
| WO | WO-97/011922 A1 | 4/1997 |
| WO | WO-98/041483 A1 | 9/1998 |
| WO | WO-00/001781 A1 | 1/2000 |
| WO | WO-03/080690 A1 | 10/2003 |
| WO | WO-2004/080907 A1 | 9/2004 |
| WO | WO-2005/103175 A1 | 11/2005 |
| WO | WO-2007/040947 A1 | 4/2007 |
| WO | WO-2008/069656 A1 | 6/2008 |
| WO | WO-2009/142237 A1 | 11/2009 |
| WO | WO-2011/063838 A1 | 6/2011 |
| WO | WO-2012/158317 A2 | 11/2012 |
| WO | WO-2014/084093 A1 | 6/2014 |
| WO | WO-2016/081557 A2 | 5/2016 |
| WO | WO-2017/023516 A1 | 2/2017 |
| WO | WO-2017/091528 A2 | 6/2017 |
| WO | WO-2017/094560 A1 | 6/2017 |
| WO | WO-2018/117068 A1 | 6/2018 |
| WO | WO-2019/172443 A1 | 9/2019 |
| WO | WO-2019/194198 A1 | 10/2019 |

(56) References Cited

FOREIGN PATENT DOCUMENTS

| WO | WO-2020/114902 A1 | 6/2020 |
|---|---|---|
| WO | WO-2020/255818 A1 | 12/2020 |

OTHER PUBLICATIONS

K. A. Shashkeev et al., "Superhydrophobic Electrically Conductive Coatings Based on a Silicone Matrix and Carbon Nanotubes," Journal of Applied Chemistry, Aug. 16, 2017, V. 90, Issue No. 7.
U.S. Office Action dated Aug. 30, 2022 in U.S. Appl. No. 16/637,512.
U.S. Office Action dated Sep. 29, 2022 in U.S. Appl. No. 16/761,544.
U.S. Notice of Allowance dated Dec. 8, 2022 in U.S. Appl. No. 16/637,512.
U.S. Office Action dated Feb. 27, 2023 in U.S. Appl. No. 16/761,544.
U.S. Office Action dated Jun. 20, 2023 in U.S. Appl. No. 17/047,848.
U.S. Office Action dated Jun. 23, 2023 in U.S. Appl. No. 16/982,261.
U.S. Advisory Office Action dated Jun. 9, 2023 in U.S. Appl. No. 16/761,544.
U.S. Office Action dated Jul. 5, 2023 in U.S. Appl. No. 17/040,200.
U.S. Office Action dated Aug. 7, 2023 in U.S. Appl. No. 17/269,877.
U.S. Office Action dated Aug. 15, 2023 in U.S. Appl. No. 16/761,544.
U.S. Office Action dated Jun. 8, 2022 in U.S. Appl. No. 16/761,300.
U.S. Office Action dated Sep. 2, 2022 in U.S. Appl. No. 16/761,300.
U.S. Notice of Allowance dated Nov. 16, 2022 in U.S. Appl. No. 16/761,300.
U.S. Office Action dated Aug. 16, 2023 in U.S. Appl. No. 17/051,067.
Final Office Action dated Nov. 15, 2023 for U.S. Appl. No. 17/047,848.
U.S. Office Action dated Jan. 10, 2024 in U.S. Appl. No. 17/051,067

* cited by examiner

OPTICAL FIBER

TECHNICAL FIELD

The present disclosure relates to an optical fiber.

This application claims priority based on Japanese Patent Application No. 2018-078261 filed on Apr. 16, 2018, and incorporates all the contents described in the Japanese application.

BACKGROUND ART

An optical fiber has generally a coating resin layer for protecting a glass fiber that is an optical transmission medium. The optical fiber is required to reduce the stress between the glass fiber and the coating resin layer to suppress the generation of defects such as voids, especially when used at low temperatures.

The coating resin layer is composed of, for example, a primary resin layer and a secondary resin layer. In Patent Literature 1, it is investigated to prevent peeling between the glass fiber and the primary resin layer at low temperatures by reducing the difference in the effective linear expansion coefficient between the primary resin layer and the secondary resin layer. In Patent Literature 2, it is investigated to form a cured layer that hardly generates residual stress in a cured film and easily absorbs external loads by using a liquid curable resin composition containing a urethane (meth) acrylate and a polymerizable monofunctional monomer.

CITATION LIST

Patent Literature

[Patent Literature 1] JP 2001-240433 A
[Patent Literature 2] JP 2004-161991 A

SUMMARY OF INVENTION

An optical fiber according to an aspect of the present disclosure comprises a glass fiber comprising a core and a cladding, a primary resin layer being in contact with a glass fiber and covering the glass fiber, and a secondary resin layer covering the primary resin layer, wherein the Young's modulus of the primary resin layer is 0.04 MPa or more and 1.0 MPa or less at 23° C.±2° C., the secondary resin layer consists of a cured product of a resin composition comprising a base resin containing a urethane (meth)acrylate oligomer, a monomer, and a photopolymerization initiator, and hydrophobic inorganic oxide particles, and the content of the inorganic oxide particles is 1% by mass or more and 60% by mass or less based on the total amount of the resin composition.

DESCRIPTION OF EMBODIMENTS

Problem to be Solved by the Present Disclosure

It is conceivable that the difference in curing shrinkage rates of a resin composition that forms a primary resin layer and a resin composition that forms a secondary resin layer is large as one of the factors for the generation of voids in an optical fiber. An object of the present disclosure is to provide an optical fiber that reduces the cure shrinkage rate of the secondary resin layer and sufficiently suppresses the generation of voids.

Effect of the Present Disclosure

The present disclosure can provide an optical fiber that reduces the cure shrinkage rate of a secondary resin layer and sufficiently suppresses the generation of voids.

Description of Embodiments of the Present Disclosure

First, the contents of the embodiment of the present disclosure will be described by listing them. An optical fiber according to an aspect of the present disclosure comprises a glass fiber comprising a core and a cladding, a primary resin layer being in contact with a glass fiber and covering the glass fiber, and a secondary resin layer covering the primary resin layer, wherein the Young's modulus of the primary resin layer is 0.04 MPa or more and 1.0 MPa or less at 23° C.±2° C., the secondary resin layer consists of a cured product of a resin composition comprising a base resin containing a urethane (meth)acrylate oligomer, a monomer, and a photopolymerization initiator, and hydrophobic inorganic oxide particles, and the content of the inorganic oxide particles is 1% by mass or more and 60% by mass or less based on the total amount of the resin composition.

Using a resin composition containing inorganic oxide particles in a specific range can reduce the curing shrinkage rate to form a secondary resin layer having excellent toughness. Combining the secondary resin layer with the primary resin layer having the Young's modulus in the above range can sufficiently suppress the generation of voids in the optical fiber.

Due to excellent dispersion properties in the resin composition and easy formation of a hard coating film, the above inorganic oxide particles may be at least one selected from the group consisting of silicon dioxide, zirconium dioxide, aluminum oxide, magnesium oxide, titanium oxide, tin oxide, and zinc oxide.

Due to easy formation of the secondary resin layer having excellent toughness, the content of the inorganic oxide particles may be 5% by mass or more and 60% by mass or less based on the total amount of the resin composition. From the viewpoint of further reducing the curing shrinkage rate, the average primary particle size of the inorganic oxide particles may be 500 nm or less.

From the viewpoint of imparting appropriate strength to the coating resin layer, the Young's modulus of the secondary resin layer may be 1300 MPa or more and 2700 MPa or less at 23° C.±2° C.

Detail of Embodiment of the Present Disclosure

Specific examples of a resin composition and an optical fiber according to embodiments of the present disclosure will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Optical Fiber>

Figure 1:
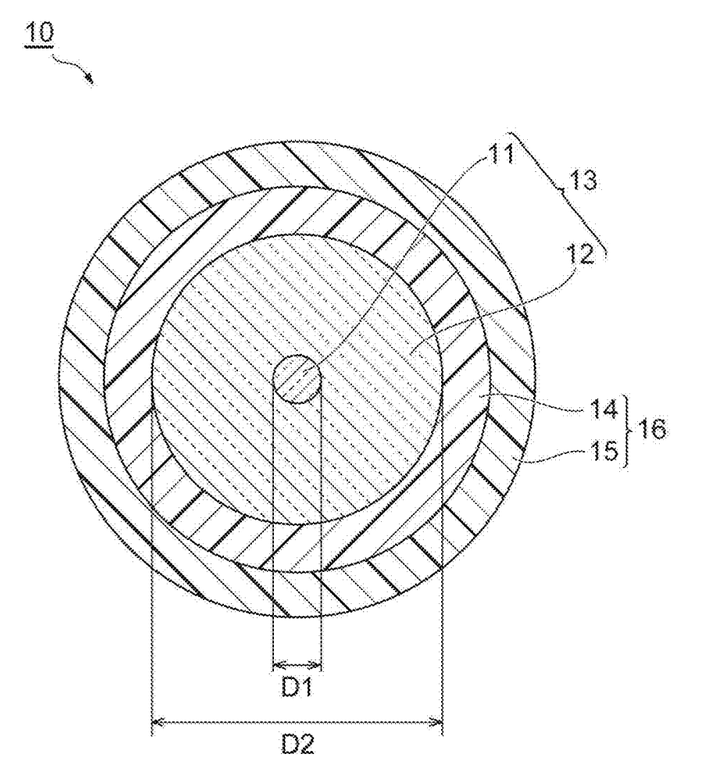
FIG. 1 is a schematic cross-section diagram showing an example of the optical fiber according to the present embodiment.

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica can be used, for example, in the core 11, and pure silica or fluorine-added silica can be used in the cladding 12.

In FIG. 1, for example, the outside diameter (D2) of the glass fiber 13 is about 125 μm, and the diameter (D1) of the core 11 constituting the glass fiber 13 is about 7 to 15 μm.

The thickness of the coating resin layer 16 is typically about 55 to 70 μm. The thickness of each of the primary resin layer 14 and the secondary resin layer 15 may be about 10 to 50 μm, and for example, the thickness of the primary resin layer 14 may be 35 μm and the thickness of the secondary resin layer 15 may be 25 μm. The outside diameter of the optical fiber 10 may be about 235 to 265 μm.

The thickness of the coating resin layer 16 may be about 27 to 48 μm. In this case, the thickness of each of the primary resin layer 14 and the secondary resin layer 15 may be about 10 to 38 μm, and for example, the thickness of the primary resin layer 14 may be 25 μm and the thickness of the secondary resin layer 15 may be 10 μm. The outside diameter of the optical fiber 10 may be about 180 to 220 μm.

(Secondary Resin Layer)

The secondary resin layer 15 can be formed by curing a resin composition comprising a base resin containing a urethane (meth)acrylate oligomer, a monomer, and a photopolymerization initiator and hydrophobic inorganic oxide particles.

(Meth)acrylate means an acrylate or a methacrylate corresponding to it. The same applies to (meth)acrylic acid and the like.

(Inorganic Oxide Particles)

The inorganic oxide particles according to the present embodiment are spherical particles and have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersibility in the resin composition. The hydrophobic group may be a reactive group such as a (meth)acryloyl group, or may be a non-reactive group such as a hydrocarbon group (for example, an alkyl group) or an aryl group (for example, a phenyl group). In the case of the inorganic oxide particles having a reactive group, the resin layer having high Young's modulus is easy to form.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. As the (meth)acryloyl compound, compounds exemplified by monomers described below may be used.

A ketone solvent such as methyl ethyl ketone (MEK), an alcohol solvent such as propylene glycol monomethyl ether (PGME), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium. When the dispersion medium including the inorganic oxide particles is observed with an optical microscope (about 100 times magnification) and no particles are observed, the inorganic oxide particles are dispersed as primary particles.

The inorganic oxide particles dispersed in the dispersion medium remain to be dispersed in the resin layer after curing of the resin layer. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin composition and easy formation of hard coating film, it is preferable that the inorganic oxide particles are at least one selected from the group consisting of silicon dioxide (silica), zirconium dioxide (zirconia), aluminum oxide (alumina), magnesium oxide (magnesia), titanium oxide (titania), tin oxide, and zinc oxide. From the view point of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment.

From the viewpoint of imparting appropriate toughness to the secondary resin layer, the average primary particle size of the inorganic oxide particles may be 500 nm or less, is preferably 200 nm or less, more preferably 100 nm or less, and further preferably 50 nm or less. From the viewpoint of reducing the curing shrinkage rate of the secondary resin layer, the average primary particle size of the inorganic oxide particles is preferably 5 nm or more, and more preferably 10 nm or more. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the inorganic oxide particles is 1% by mass or more and 60% by mass or less, more preferably 5% by mass or more and 60% by mass or less, and further preferably 8% by mass or more and 60% by mass or less, based on the total amount of the resin composition. The content of the inorganic oxide particles of 1% by mass or more allows easy reduction in curing shrinkage. The content of the inorganic oxide particles of 60% by mass or less allows easy formation of the secondary resin layer having excellent toughness.

(Base Resin)

A resin composition according to the present embodiment contains a urethane (meth)acrylate oligomer. As the urethane (meth)acrylate oligomer, an oligomer obtained by reacting a polyol compound, a polyisocyanate compound, and a hydroxyl group-containing (meth)acrylate compound can be used.

Examples of the polyol compound include polytetramethylene glycol, polypropylene glycol and bisphenol A-ethylene oxide addition diol. The number average molecular weight of the polyol compound may be 400 to 1000. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth) acrylate, pentaerythritol tri(meth)acrylate, 2-hydroxypropyl (meth)acrylate, and tripropylene glycol mono(meth)acrylate.

As a catalyst for synthesizing a urethane (meth)acrylate oligomer, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the view point of easy availability or catalyst performance, it is preferable that dibutyltin dilaurate or dibutyltin diacetate be used as catalyst.

When the urethane (meth)acrylate oligomer is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

As the monomer, a monofunctional monomer having one polymerizable group or a multifunctional monomer having two or more polymerizable groups can be used. A monomer may be used by mixing two or more monomers.

Examples of the monofunctional monomer include (meth) acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth) acrylate, lauryl (meth)acrylate, 2-phenoxyethyl (meth)acrylate, 3-phenoxybenzyl acrylate, phenoxydiethylene glycol (meth)acrylate, phenoxypolyethylene glycol (meth)acrylate, nonylphenoxypolyethylene glycol (meth)acrylate, 4-tert-butylcyclohexanol (meth)acrylate, tetrahydrofurfuryl (meth) acrylate, benzyl (meth)acrylate, dicyclopentenyl (meth) acrylate, dicyclopentenyloxyethyl (meth)acrylate, dicyclopentanyl (meth)acrylate, nonylphenol polyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing (meth)acrylates such as N-acryloyl morpholine, N-vinyl pyrrolidone, N-vinyl caprolactam, N-acryloylpiperidine, N-methacryloylpiperidine, N-acryloylpyrrolidine, 3-(3-pyridine) propyl (meth) acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

From the viewpoint of adjusting the Young's modulus of the coating film formed from the resin composition, isobornyl (meth)acrylate or 4-tert-butylcyclohexanol (meth)acrylate is preferable, and isobornyl (meth)acrylate is more preferable as a monofunctional monomer.

Examples of the multifunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyl diol di(meth)acrylate, 3-ethyl-1, 8-octanediol di(meth)acrylate, EO adduct of bisphenol A di(meth)acrylate, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth) acrylate, ditrimethylol propane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl] isocyanurate.

From the viewpoint of forming a coating film having a desired Young's modulus, tripropylene glycol di(meth)acrylate, 1,6-hexanediol di(meth)acrylate, and trimethylolpropane tri(meth)acrylate may be used as a polyfunctional monomer. Among them, tripropylene glycol di(meth)acrylate is preferable as a polyfunctional monomer.

The above resin composition preferably contains 18% by mass or more and 50% by mass or less of a monomer based on the total amount of the base resin, more preferably contains 20% by mass or more and 46% by mass or less, further preferably contains 20% by mass or more and 40% by mass or less, and particularly preferably contains 20% by mass or more and 30% by mass or less. Containing the monomer in the above range allows easy preparation of the resin composition that is more excellent in the balance between application properties and coating film properties.

The photopolymerization initiator can be appropriately selected from known radical photopolymerization initiators and used. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropan-1-one, 2,4,4-trimethylpentylphosphine oxide, 2,4,4-trimethylbenzoyldiphenylphosphine oxide, 2-methyl-1-[4-(methylthio)phenyl]-2-morpholinopropan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

Due to adjustment of the Young's modulus of the secondary resin layer, the resin composition may further contain an epoxy (meth)acrylate oligomer. As an epoxy (meth)acrylate oligomer, an oligomer obtained by reacting a compound having a (meth)acryloyl group with an epoxy resin having two or more glycidyl groups can be used.

The resin composition may further contain a silane coupling agent, a photoacid generator, a leveling agent, an antifoaming agent, an antioxidant, and the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

As the photoacid generator, an onium salt having an $A^+B^-$ structure may be used. Examples of the photoacid generator include sulfonium salts such as UVACURE 1590 (manufactured by Daicel-Cytec), CPI-100P, 110P (manufactured by San-Apro Ltd.), 210S (manufactured by San-Apro Ltd.) and iodonium salts such as Omnicat 250 (manufactured by IGM Regins), WPI-113 (manufactured by FUJIFILM Wako Pure Chemical Corporation), Rp-2074 (manufactured by Rhodia Japan Ltd.).

The Young's modulus of the secondary resin layer 15 is preferably 1300 MPa or more at 23° C.±2° C., more preferably 1300 MPa or more and 2700 MPa or less, and further preferably 1300 MPa or more and 2500 MPa or less. A Young's modulus of the secondary resin layer of 1300 MPa or more is easy to improve the lateral pressure characteristics of the optical fiber, and the Young's modulus of 2700 MPa or less can provide proper toughness to the secondary resin layer so that crack or the like in the secondary resin layer is hard to occur.

From the viewpoint of residual stress, the glass transition temperature (Tg) of the secondary resin layer may be 60° C. or more and 120° C. or less, is preferably 65° C. or more and 115° C. or less, more preferably 70° C. or more and 110° C. or less, and further preferably 75° C. or more and 100° C. or less.

The curing shrinkage rate in forming the secondary resin layer is preferably 2.0 to 8.0%, more preferably 2.0 to 7.5%, and further preferably 2.5 to 7.0%. The difference between the curing shrinkage rate of the secondary resin layer and the curing shrinkage rate of the primary resin layer is preferably within 3%. The method of measuring the cure shrinkage rate is not particularly limited and can be measured, for example, by the following method. A Teflon (registered trademark) ring (inner diameter of 1 cm) is placed on a glass plate, 1 mL of the resin composition is placed in the ring, and the resin composition is cured by irradiating it with 4000 mJ/cm² of ultraviolet ray. The cure shrinkage rate is then determined from the heights of the resin surface before and after curing. Specifically, when the height of the resin surface before curing is $T_0$ and the height of the resin surface after curing is $T_D$, the cure shrinkage rate is calculated by using the following formula.

$$\text{Curing shrinkage rate} = (T_0 - T_D)/T_0 \times 100$$

(Primary Resin Layer)

In order to suppress the generation of voids in the optical fiber, the Young's modulus of the primary resin layer 14 is 0.04 MPa or more and 1.0 MPa or less at 23° C.±2° C., and may be 0.05 MPa or more and 0.9 MPa or less, or 0.05 MPa or more and 0.8 MPa or less.

The primary resin layer 14 can be formed by curing a resin composition including a urethane (meth)acrylate oligomer, a monomer, a photopolymerization initiator and a silane coupling agent. That is, the primary resin layer 14 can include a cured product of the resin composition containing a urethane (meth)acrylate oligomer, a monomer, a photopolymerization initiator, and a silane coupling agent. The content of urethane (meth)acrylate oligomer in the resin composition is preferably 35% by mass or more and 90% by mass or less, more preferably 50% by mass or more and 85% by mass or less, and more preferably 60% by mass or more and 80% by mass or less, based on the total amount of the resin composition.

As a urethane (meth)acrylate oligomer, an oligomer obtained by reacting a polyol compound, a polyisocyanate compound, a hydroxyl group-containing (meth)acrylate compound, and an alcohol may be used.

The Young's modulus of the primary resin layer 14 may be adjusted to a target range depending on the blending ratio of a hydroxyl group-containing (meth)acrylate compound and an alcohol used when synthesizing a urethane (meth)acrylate oligomer. The blending ratio of the alcohol is increased to decrease the oligomer having reactive (meth)acryloyl groups at both ends, easily decreasing the Young's modulus. In addition, the Young's modulus of the primary resin layer 14 may be adjusted to a target range depending on the molecular weight of the polyol compound used when synthesizing the urethane (meth)acrylate oligomer. The number average molecular weight of the polyol compound is preferably 1000 to 8000, more preferably 1200 to 6500, and further preferably 1500 to 6000.

A urethane (meth)acrylate oligomer, a monomer, a photopolymerization initiator and a silane coupling agent may be appropriately selected from compounds exemplified in the above base resin. Note that the resin composition that forms the primary resin layer has a different composition from the base resin that forms the secondary resin layer.

EXAMPLES

Hereinafter, the results of evaluation test using Examples and Comparative Examples according to the present disclosure will be shown, and the present disclosure is described in more detail. The present invention is not limited to these examples.

[Resin Composition for a Secondary Resin Layer]
(Oligomer)

As the oligomer, a urethane acrylate oligomer (UA) obtained by reacting a polypropylene glycol having a molecular weight of 600, 2,4-tolylene diisocyanate, and hydroxyethyl acrylate and an epoxy acrylate oligomer (EA) were prepared.

(Monomer)

As the monomer, isobornyl acrylate (trade name "IBXA" of Osaka Organic Chemical Industry Co., Ltd.), tripropylene glycol diacrylate (trade name "TPGDA" of Daicel Ornex Co., Ltd.), and 2-phenoxyethyl acrylate (trade name "Light Acrylate PO-A" of Kyoei Chemical Co., Ltd.) were prepared.

(Photopolymerization Initiator)

As the photopolymerization initiator, 1-hydroxycyclohexyl phenyl ketone and 2,4,6-trimethylbenzoyldiphenylphosphine oxide were prepared.

(Inorganic Oxide Particles)

As the inorganic oxide particles, hydrophobic silica particles dispersed in MEK, having methacryloyl groups, and with an average primary particle size of 10 to 15 nm were prepared.

(Resin Composition)

First, a base resin was prepared by mixing the above oligomer, monomer, and photopolymerization initiator. Next, the base resin and the silica particles were mixed, and then most of MEK as a dispersion medium was removed under reduced pressure to produce a resin composition for the secondary resin layer. The content of remaining MEK in the resin composition was 5% by mass or less.

In Table 1, Table 2 and Table 3, the value of the monomer is the content based on the total amount of the base resin, the value of the oligomer is the content based on the total amount of the monomer, oligomer, and silica particles, and the value of silica particles is the content based on the total amount of the resin composition.

The following evaluation was performed by using the obtained resin composition for the secondary resin layer. The results are shown in Tables 1 to 3.

(Curing Shrinkage Rate)

A Teflon ring (inner diameter: 1 cm) was placed on a glass plate, 1 mL of the resin composition was placed in the ring, and the resin composition was cured by irradiating it with 4000 mJ/cm² of ultraviolet ray. The cure shrinkage rate was determined from the heights of the resin surface before and after curing.

[Resin Composition for the Primary Resin Layer]
(Oligomer)

Urethane acrylate oligomers a1, a2, and a3 obtained by reacting polypropylene glycol with a molecular weight of 4000, isophorone diisocyanate, hydroxyethyl acrylate, and methanol were prepared. For the urethane acrylate oligomers a1, a2, and a3, the ratio of an oligomer having acryloyl groups at both ends and an oligomer having an acryloyl group at one end is adjusted by changing the blending ratio of hydroxyethyl acrylate and methanol.

(Resin Composition)

75 parts by mass of a urethane acrylate oligomer a1, a2, or a3, 12 parts by mass of a nonylphenoxy polyethylene glycol acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to produce each of a resin composition for the primary resin layer.

[Production of an Optical Fiber]

On the outer periphery of a 125 µm diameter glass fiber composed of a core and cladding, a primary resin layer with a thickness of 35 µm was formed by using a resin composition for the primary resin layer, and a secondary resin layer was formed on the outer periphery thereof by using a resin composition for the secondary resin layer to produce optical fibers in Examples and Comparative Examples. A linear speed was 1500 m/min.

(Young's Modulus of the Primary Resin Layer)

The Young's modulus of the primary resin layer was measured by the Pullout Modulus (POM) method at 23° C. Two parts of an optical fiber were fixed with two chuck devices, a coating resin layer (the primary resin layer and the secondary resin layer) between the two chuck devices was removed, and then one chuck device was fixed and another chuck device was slowly moved in the opposite direction of the fixed device. When the length of the portion sandwiched between the chuck devices to be moved in the optical fiber is L, the amount of movement of the chuck is Z, the outer diameter of the primary resin layer is Dp, the outer diameter of the glass fiber is Df, the Poisson's ratio of the primary resin layer is n, and the load in moving the chuck device is W, the Young's modulus of the primary resin layer was determined from the following formula.

$$\text{Young's modulus (MPa)} = ((1+n)W/\pi LZ) \times \ln(Dp/Df)$$

(Young's Modulus of the Secondary Resin Layer)

The Young's modulus of the secondary resin layer was determined from 2.5% secant value by using a pipe-shaped coating resin layer (length: 50 mm or more) obtained by taking out a glass fiber from an optical fiber to perform a tensile test (distance between marked lines: 25 mm) in an environment of 23±2° C. and 50±10% RH.

(Glass Transition Temperature of the Secondary Resin Layer)

For measurement of the glass transition temperature of the secondary resin layer, the dynamic viscoelasticity of a coating resin layer was measured by using a pipe-shaped coating resin layer obtained by taking out a glass fiber from an optical fiber and by using "RSA 3" from TA Instruments, Inc. in the condition of tensile mode (distance between marked lines: 10 mm), a frequency of 11 Hz, a heating rate of 5° C./min, and a temperature range of 30 to 150° C. The peak top temperature of measured tan δ was defined as the glass transition temperature (Tg) of the secondary resin layer.

(Observation of Voids)

An optical fiber of 10 m was stored at 85° C. and 85% humidity for 120 days and then left at −40° C. for 16 hours, and the presence or absence of voids with a diameter of 10 µm or more was observed with a microscope. The case where the number of voids per 1 m of the optical fiber was less than 1 was evaluated as "A", the case where the number of voids was 1 to 2 was evaluated as "B", and the case where the number of voids exceeded 2 was evaluated as "C". The results are shown in Tables 1 to 3.

TABLE 1

| Example | 1 | 2 | 3 | 4 | 5 | 6 |
|---|---|---|---|---|---|---|
| Primary resin layer | | | | | | |
| Oligomer | a2 | a2 | a2 | a2 | a2 | a2 |
| Young's modulus (MPa) | 0.2 | 0.2 | 0.2 | 0.2 | 0.2 | 0.2 |
| Secondary resin layer | | | | | | |
| Oligomer UA (% by mass) | 47.5 | 45.5 | 41.0 | 35.0 | 30.0 | 20.0 |
| EA | 14.3 | — | 12.3 | 10.5 | 9.0 | — |
| Monomer (% by mass) | 33.3 | 45.5 | 28.7 | 24.5 | 21.0 | 20.0 |
| Silica particles (% by mass) | 5 | 5 | 18 | 30 | 40 | 60 |
| Average primary particle size of silica particles (nm) | 10-15 | 10-15 | 10-15 | 10-15 | 10-15 | 10-15 |
| Curing shrinkage rate (%) | 7.0 | 7.5 | 6.5 | 6.0 | 4.4 | 2.0 |
| Tg (° C.) | 80 | 90 | 80 | 80 | 80 | 85 |
| Young's modulus (MPa) | 1300 | 1350 | 1600 | 1900 | 2300 | 2700 |
| Generation of voids | A | A | A | A | A | A |

TABLE 2

| Example | 7 | 8 | 9 | 10 | 11 | 12 |
|---|---|---|---|---|---|---|
| Primary resin layer | | | | | | |
| Oligomer | a1 | a3 | a1 | a3 | a1 | a3 |
| Young's modulus (MPa) | 0.05 | 0.8 | 0.05 | 0.8 | 0.05 | 0.8 |
| Secondary resin layer | | | | | | |
| Oligomer UA (% by mass) | 47.5 | 47.5 | 35.0 | 35.0 | 20.0 | 20.0 |
| EA | 14.3 | 14.3 | 10.5 | 10.5 | — | — |
| Monomer (% by mass) | 33.3 | 33.3 | 24.5 | 24.5 | 20.0 | 20.0 |
| Silica particles (% by mass) | 5 | 5 | 30 | 30 | 60 | 60 |
| Average primary particle size of silica particles (nm) | 10-15 | 10-15 | 10-15 | 10-15 | 10-15 | 10-15 |
| Curing shrinkage rate (%) | 7.0 | 7.0 | 6.0 | 6.0 | 4.4 | 2.0 |
| Tg (° C.) | 80 | 80 | 80 | 80 | 85 | 85 |
| Young's modulus (MPa) | 1300 | 1300 | 1900 | 1900 | 2700 | 2700 |
| Generation of voids | A | A | A | A | A | A |

TABLE 3

| Comparative example | 1 | 2 | 3 |
|---|---|---|---|
| Primary resin layer | | | |
| Oligomer | a2 | a2 | a2 |
| Young's modulus (MPa) | 0.2 | 0.2 | 0.2 |
| Secondary resin layer | | | |
| Oligomer UA (% by mass) | 60.0 | 30.0 | 17.5 |
| EA | 5.0 | 33.0 | — |
| Monomer (% by mass) | 35.0 | 35.0 | 17.5 |
| Silica particles (% by mass) | — | — | 65 |
| Average primary particle size of silica particles (nm) | — | — | 10-15 |
| Curing shrinkage rate (%) | 8.6 | 10.0 | —* |
| Tg (° C.) | 65 | 115 | 85 |
| Young's modulus (MPa) | 1100 | 1600 | 2750 |
| Generation of voids | B | C | —* |

*A cured product was cracked so that evaluation failed.

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. An optical fiber comprising a glass fiber comprising a core and a cladding; a primary resin layer being in contact with the glass fiber and covering the glass fiber; and a secondary resin layer covering the primary resin layer,
    wherein a Young's modulus of the primary resin layer is 0.04 MPa or more and 1.0 MPa or less at 23° C.±2° C., and
    wherein the secondary resin layer consists of a cured product of a resin composition comprising a base resin containing a urethane (meth)acrylate oligomer, a monomer, and a photopolymerization initiator; and hydrophobic inorganic oxide particles, and a content of the inorganic oxide particles is 8% by mass or more and 60% by mass or less based on a total amount of the resin composition.

2. The optical fiber according to claim 1, wherein the inorganic oxide particle is at least one selected from the group consisting of silicon dioxide, zirconium dioxide, aluminum oxide, magnesium oxide, titanium oxide, tin oxide, and zinc oxide.

3. The optical fiber according to claim 1, wherein an average primary particle size of the inorganic oxide particles is 500 nm or less.

4. The optical fiber according to claim 1, wherein a Young's modulus of the secondary resin layer is 1300 MPa or more and 2700 MPa or less at 23° C.±2° C.

5. The optical fiber according to claim 1, wherein a glass transition temperature of the secondary resin layer is 60° C. or more and 120° C. or less.

6. The optical fiber according to claim 1, wherein the resin composition contains 18% by mass or more and 50% by mass or less of the monomer based on a total amount of the base resin.

7. The optical fiber according to claim 2, wherein an average primary particle size of the inorganic oxide particles is 500 nm or less.

* * * * *